United States Patent
Yin et al.

(10) Patent No.: US 9,260,255 B2
(45) Date of Patent: Feb. 16, 2016

(54) GUIDER FOR CONVEYING SHEET-SHAPED OBJECT

(75) Inventors: Guangjun Yin, Guangzhou (CN); En Wu, Guangzhou (CN); Dong Tan, Guangzhou (CN)

(73) Assignee: GRG BANKING EQUIPMENT CO., LTD., Guangzhou (CN)

( * ) Notice: Subject to any disclaimer, the term of this patent is extended or adjusted under 35 U.S.C. 154(b) by 0 days.

(21) Appl. No.: 13/882,988

(22) PCT Filed: Mar. 27, 2012

(86) PCT No.: PCT/CN2012/073095
§ 371 (c)(1),
(2), (4) Date: May 2, 2013

(87) PCT Pub. No.: WO2012/139460
PCT Pub. Date: Oct. 18, 2012

(65) Prior Publication Data
US 2014/0021011 A1    Jan. 23, 2014

(30) Foreign Application Priority Data

Apr. 13, 2011   (CN) .......................... 2011 1 0092162

(51) Int. Cl.
*B65G 47/10* (2006.01)
*B65H 5/16* (2006.01)
(Continued)

(52) U.S. Cl.
CPC ............... *B65G 47/46* (2013.01); *B65H 29/58* (2013.01); *B65H 2301/3125* (2013.01); *B65H 2301/44822* (2013.01); *B65H 2403/50* (2013.01); *B65H 2404/63* (2013.01); *B65H 2701/1912* (2013.01)

(58) Field of Classification Search
USPC ............................ 198/367; 271/301, 303, 291
See application file for complete search history.

(56) References Cited

U.S. PATENT DOCUMENTS

| 4,441,704 A | 4/1984 | Uchida et al. |
| 5,167,300 A | 12/1992 | Yoshida et al. |

(Continued)

FOREIGN PATENT DOCUMENTS

| CN | 1540591 A | 10/2004 |
| CN | 101081668 A | 12/2007 |

(Continued)

OTHER PUBLICATIONS

The European Search Report issued on Aug. 18, 2014 for EP counterpart application 12771227.1.
(Continued)

*Primary Examiner* — Gene Crawford
*Assistant Examiner* — Lester Rushin
(74) *Attorney, Agent, or Firm* — Kilpatrick Townsend & Stockton LLP

(57) ABSTRACT

A guider for conveying a sheet-shaped object comprises two side plates (13, 14); two wheel components (7, 11) arranged in parallel between the two side plates (13, 14), a top channel plate (9) being disposed on the wheel components; and two side channel components (10, 8) disposed between the two wheel components (7, 11) and the top channel plate (9), the two side channel components (10, 8) forming a horizontal channel with the top channel plate (9), and each forming a lateral channel with the wheel component at the same side, two ends of the side channel component being respectively hinged on the two side plates (13, 14). The guider further comprises two swing plates (6, 17) respectively fixedly disposed on the two side channel components (10, 8); a first driving device for driving the two swing plates (6, 17) to swing; a reversing member (19) hinged between the two lateral channels and used for switch between the two lateral channels; and a second driving device for driving the reversing member (19) to swing. The guider for conveying a sheet-shaped object of the present invention simplifies the structure of the guider, and meanwhile reduces the manufacturing cost of the guider.

16 Claims, 7 Drawing Sheets

(51) Int. Cl.
*B65G 47/46* (2006.01)
*B65H 29/58* (2006.01)

(56) References Cited

U.S. PATENT DOCUMENTS

| | | | |
|---|---|---|---|
| 5,536,002 A | 7/1996 | Yoshida et al. | |
| 5,582,107 A | 12/1996 | Nozaki | |
| 6,572,105 B2 * | 6/2003 | Baker et al. | 271/303 |
| 7,108,260 B2 * | 9/2006 | Biegelsen et al. | 271/303 |
| 8,246,036 B2 * | 8/2012 | Sato et al. | 271/3.14 |
| 2008/0143042 A1 * | 6/2008 | Spence et al. | 271/225 |
| 2010/0194033 A1 | 8/2010 | Berendes | |

FOREIGN PATENT DOCUMENTS

| | | |
|---|---|---|
| CN | 101772787 A | 7/2010 |
| CN | 101983168 A | 3/2011 |
| EP | 0915436 A1 | 5/1999 |
| EP | 1544144 A1 | 6/2005 |

OTHER PUBLICATIONS

The Australian Examination Report No. 1 issued on Oct. 17, 2014 for the Australian counterpart application 2012242407.

* cited by examiner

GUIDER FOR CONVEYING SHEET-SHAPED OBJECT

The present application is the national phase of International Application No. PCT/CN2012/073095, titled "GUIDER FOR CONVEYING SHEET-SHAPED OBJECT" filed on Mar. 27, 2012 which claims the benefit of priority to Chinese patent application No. 201110092162.9 titled "GUIDER FOR CONVEYING SHEET-SHAPED OBJECT", filed with the Chinese State Intellectual Property Office on Apr. 13, 2011, the entire disclosure of which are incorporated herein by reference.

FIELD OF THE INVENTION

The present application relates to the technical field of reversing devices, and more specifically, to a guider for conveying sheet materials.

BACKGROUND OF THE INVENTION

In our life, devices for processing sheet materials are available, such as an automatic teller machine, a moneychanger, a ticket vending machine. Objects processed by these processing devices are sheet materials such as banknotes or bills. When the processing devices deal with sheet materials, the sheet materials need to be conveyed in different directions in accordance with requirements of processing.

Chinese patent application No. 200880101729.0 discloses a three-way guider for reversing sheet medium which can achieve the conveying and guiding of sheet materials in three directions. The guider has three driving devices, i.e., one step motor and two lifting magnets. The operation processes of the guider when performing the redirection of two lateral passages are as follows. The step motor drives a driving rod to rotate via two driving wheels. Pinions are provided on two ends of the driving rod, and racks are integrally provided on two guide plates of the guider. During the rotation of the driving rod, the pinions engage with the racks, thereby driving the guide plates to move upwardly or downwardly. Since blades of the guider are provided on the guide plates, the upward or downward movements of the guide plates result in the upward or downward movements of the blades of the guider, thereby realizing the redirection of the two lateral passages. As can be seen from the above operation processes, the redirection between the two lateral passages involves many transmission components. In order to ensure the normal upward or downward movements of the blades of the guider, each of the two ends of the guider body needs a pinion and rack transmission. The more transmission components needed for the redirection between the two lateral passages of the guider causes a complicated structure of the whole guider.

In addition, the above three-way guider needs the step motor and two lifting magnets to achieve the conveying of the sheet materials in three directions. The whole guider involves many power devices, thereby increasing production cost of the whole guider.

SUMMARY OF THE INVENTION

In view of the above fact, it is provided according to the present application a guider for conveying sheet materials, to simplify the structure of the whole guider and to reduce the production cost of the whole guider.

In order to achieve the above object, the present application provides the following technical solutions.

A guider for conveying sheet materials, including:
two side plates;
two wheel assemblies disposed in parallel between the two side plates, a top passage plate being provided at the tops of the two wheel assemblies;
two lateral passage assemblies provided among the top passage plate and the two wheel assemblies, wherein the two lateral passage assemblies can form a horizontal passage with the top passage plate, and each of the lateral passage assemblies can form a lateral passage with the wheel assembly located at the same side, and two ends of each lateral passage assembly are hinged to the two side plates; the guider further includes:
two swing plates fixedly connected to the two lateral passage assemblies, respectively;
a first driving device configured to drive the two swing plates to swing;
a reversing member hinged between the two lateral passages and configured for switching between the two lateral passages; and
a second driving device configured to drive the reversing member to swing.

Preferably, in the guider for conveying sheet materials, a spring is provided at a swing end of each of the two swing plates, and is connected to the side plate located at the same side as the swing plates.

Preferably, in the guider for conveying sheet materials, each of the two lateral passage assemblies includes a rotation shaft and a plurality of comb teeth provided on the rotation shaft.

Preferably, in the guider for conveying sheet materials, the plurality of comb teeth is uniformly provided on the rotation shaft.

Preferably, in the guider for conveying sheet materials, the first driving device includes a motor, a cam and a movable plate for driving the two swing plates to swing, wherein:
the cam is provided at an output end of the motor, and an edge of the cam is in contact with one end of the movable plate, the other end of the movable plate is in contact with swing ends of the two swing plates.

Preferably, in the guider for conveying sheet materials, a V-shaped groove is formed by the two swing plates, and a positioning protrusion cooperated with the V-shaped groove is provided on the movable plate.

Preferably, in the guider for conveying sheet materials, oblong guiding holes are provided in the movable plate in a direction of the movement of the movable plate, and a guiding shaft is provided in each of the oblong guiding holes.

Preferably, the guider for conveying sheet materials further includes a controller and a sensor. The controller is configured to control the motor to activate or stop, and the sensor is located at a side of a bottom end of the movable plate and is configured to sense the movable plate. The controller controls the motor to activate or stop according to an output signal of the sensor.

Preferably, in the guider for conveying sheet materials, the sensor is fixedly connected to the side plate adjacent to the sensor via a sensor fixing seat.

Preferably, the guider for conveying sheet materials is a guider for conveying banknotes.

As can be known from the above technical solutions, in the guider for conveying sheet materials according to the embodiments of the present application, a horizontal passage is formed between the top passage plate and the two lateral passage assemblies disposed among the two wheel assemblies and the top passage plate, a lateral passages is formed between each lateral passage assembly and the wheel assembly located at the same side. Thus, the horizontal passage and two lateral passages are formed by the above components, thereby achieving the conveying of sheet materials in three directions as the guider in the prior art. In addition, two ends of each of the two lateral passage assemblies are hinged to two side plates, respectively, and two swing plates are disposed on the two lateral passage assemblies, respectively. Since each lateral passage assembly is hinged to the two side plates, the two lateral passage assemblies can rotate relative to each other when the first driving device drives the swing plates to swing. The switch between the horizontal passage and the lateral passages can be achieved with the sings of the lateral passage assemblies. Besides, the second driving device drives the reversing member to rotate, thereby achieving the switch between the two lateral passages, which can ensure that sheet materials are conveyed in one of the lateral passages.

Compared with the guider in the prior art, in the guider for conveying sheet materials according to the present application, only the second driving device is needed to rotate the reversing member hinged between the two lateral passages to achieve the switch between the two lateral passages. There is no need to provide transmission components at both ends of the reversing member because of the hinged arrangement of the reversing member. In the present application, the switch between the two lateral passages can be achieved merely by rotating the reversing member through the second driving device. While in the prior art, the step motor, the driving wheel, the driving rod and the pinion and rack transmission mechanisms at both ends of the driving rod are all needed to achieve the switch between the two lateral passages. Compared with the redirection between two lateral passages achieved by a series of transmission components, the guider for conveying sheet materials according to the present application has a simplified structure.

Furthermore, in the guider for conveying sheet materials according to the embodiment of the present application, only one power device (the second driving device) is needed to drive the reversing member to rotate, so as to achieve the switch between the two lateral passages, and the movements of the swing plates are achieved by the first driving device. Thus, at most two power devices are applied in the guider for conveying sheet materials according to the present application at most. Compared with the guider in the prior art which employs one step motor and two lifting magnets to achieve the switch between the passages, in the present application, the power sources are reduced, and the production cost of the guider is reduced.

BRIEF DESCRIPTION OF THE DRAWINGS

Hereinafter, in order to clearly describe embodiments of the present application or the technical solution in the prior art, drawings referred to in the description of the embodiments or the prior art will be briefly described. Apparently, the drawings described below are only some embodiments of the present application, and the person skilled in the art may obtain other drawings based on the drawings without creative effort.

DETAILED DESCRIPTION OF THE INVENTION

Hereinafter, technical solutions of the embodiments of the present application will be described clearly and completely in conjunction with the drawings of the embodiments of the present application. Apparently, the embodiments described herein are merely a part of, not all of, the embodiments of the present application. Based on the embodiments of the present application, all of other embodiments obtained by the skilled in the art without creative effort are deemed to fall into the protection scope of the present application.

In an embodiment of the present application, a guider for conveying sheet materials is disclosed, which has a simple structure and has a reduced number of driving devices compared with the guider in the prior art, thereby decreasing the production cost of the whole guider.

Figure 1:
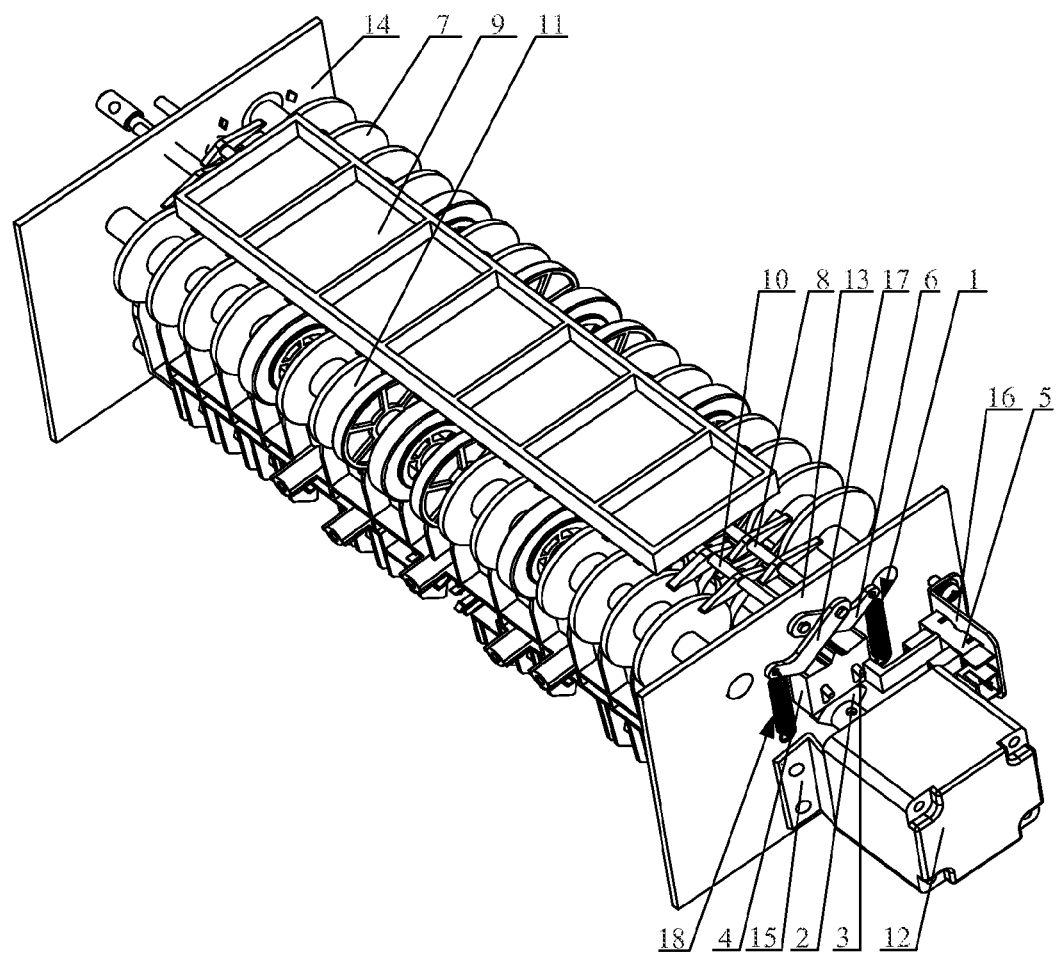
FIG. 1 is a structural schematic view of a guider for conveying sheet materials according to an embodiment of the present application.
Figure 2:
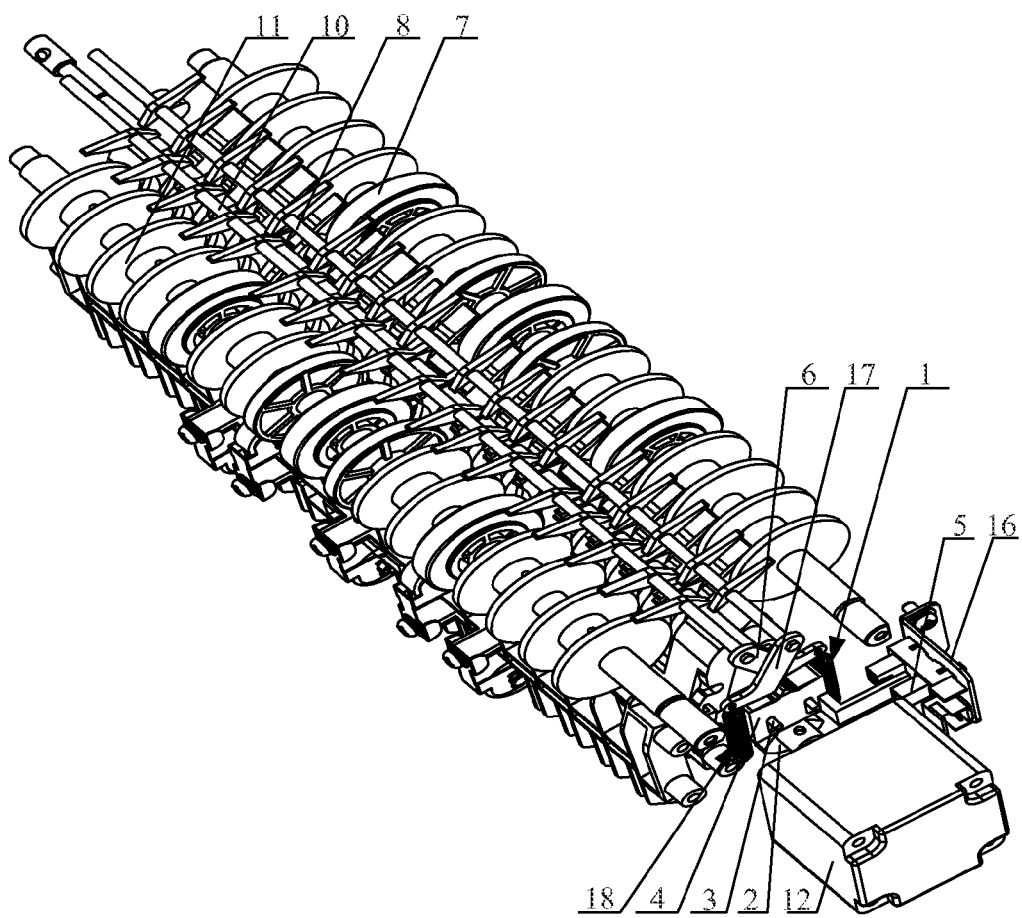
FIG. 2 is a partial structural schematic view of a guider for conveying sheet materials according to an embodiment of the present application.
Figure 3:
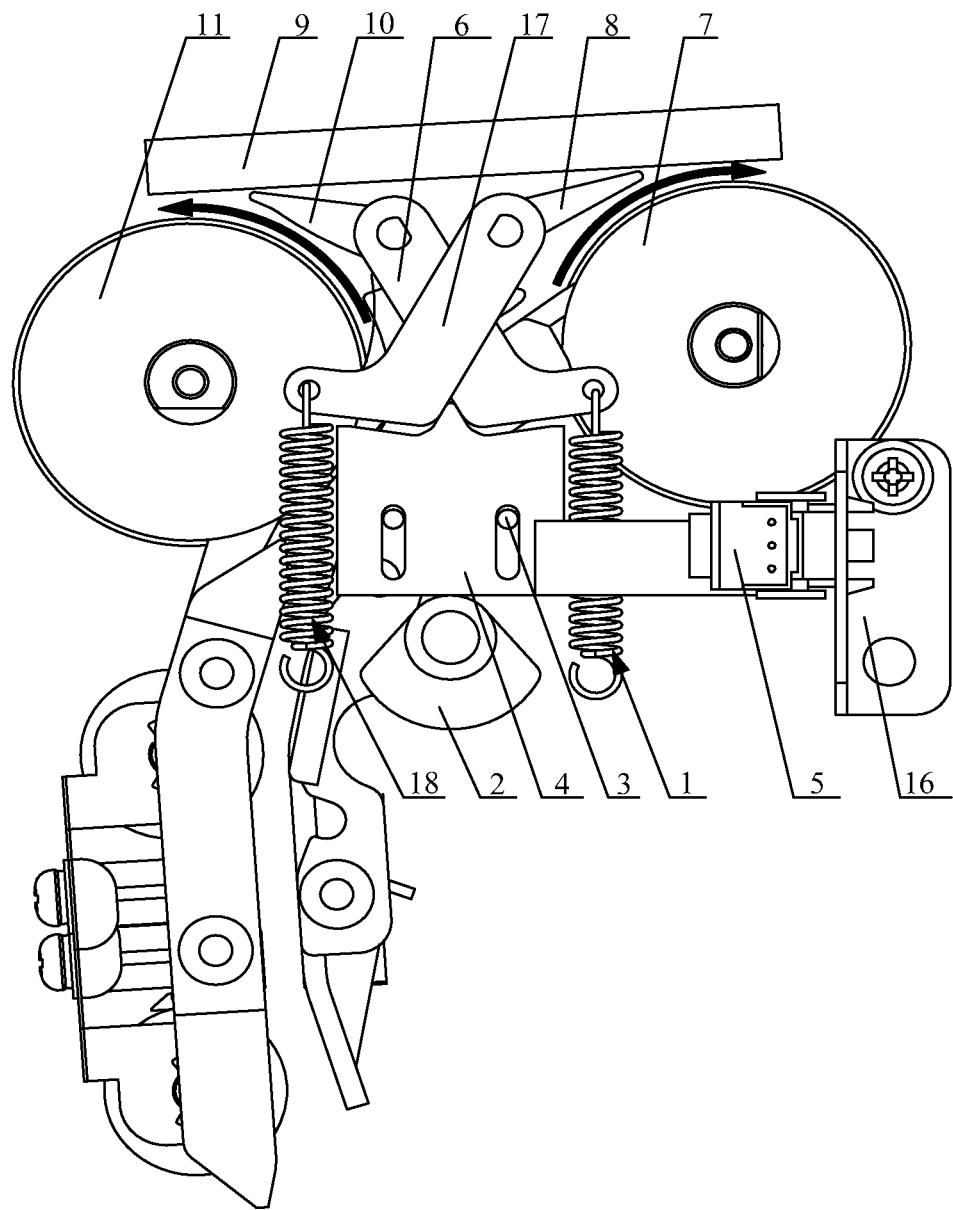
FIG. 3 is a structural schematic view of a guider for conveying sheet materials according to an embodiment of the present application, in which two lateral passages are opened.
Figure 4:
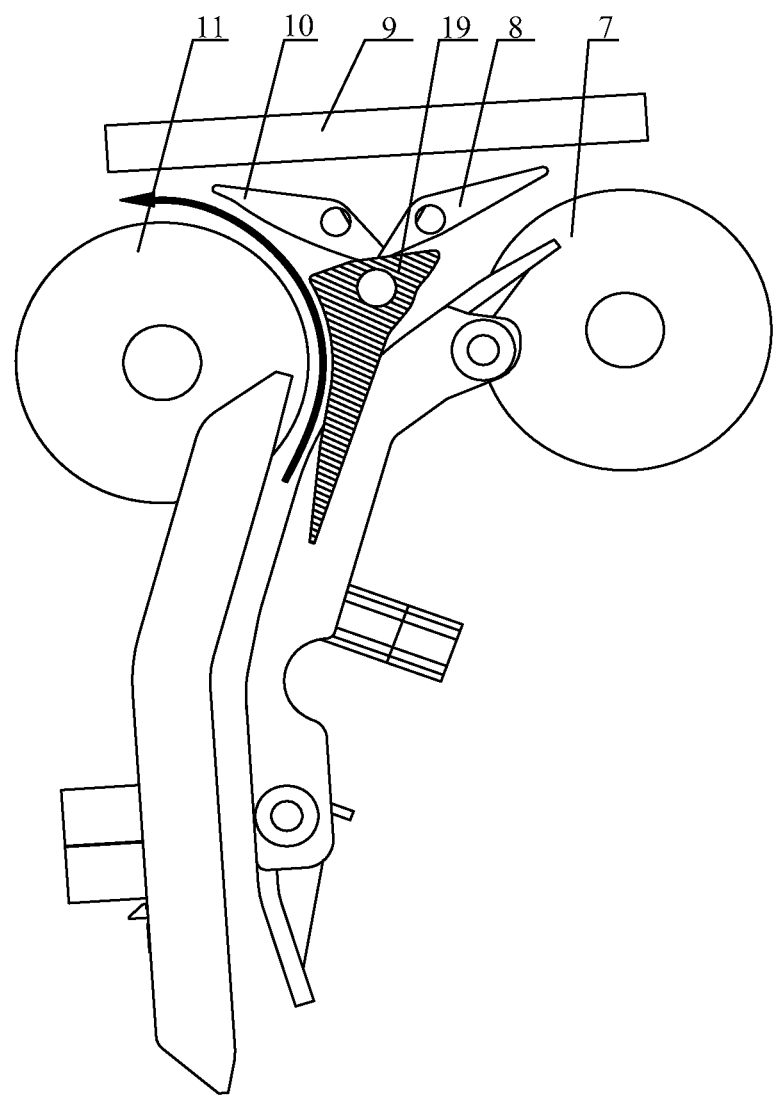
FIG. 4 is an inner structure schematic view of a guider for conveying sheet materials according to an embodiment of the present application, in which one lateral passage is opened.
Figure 5:
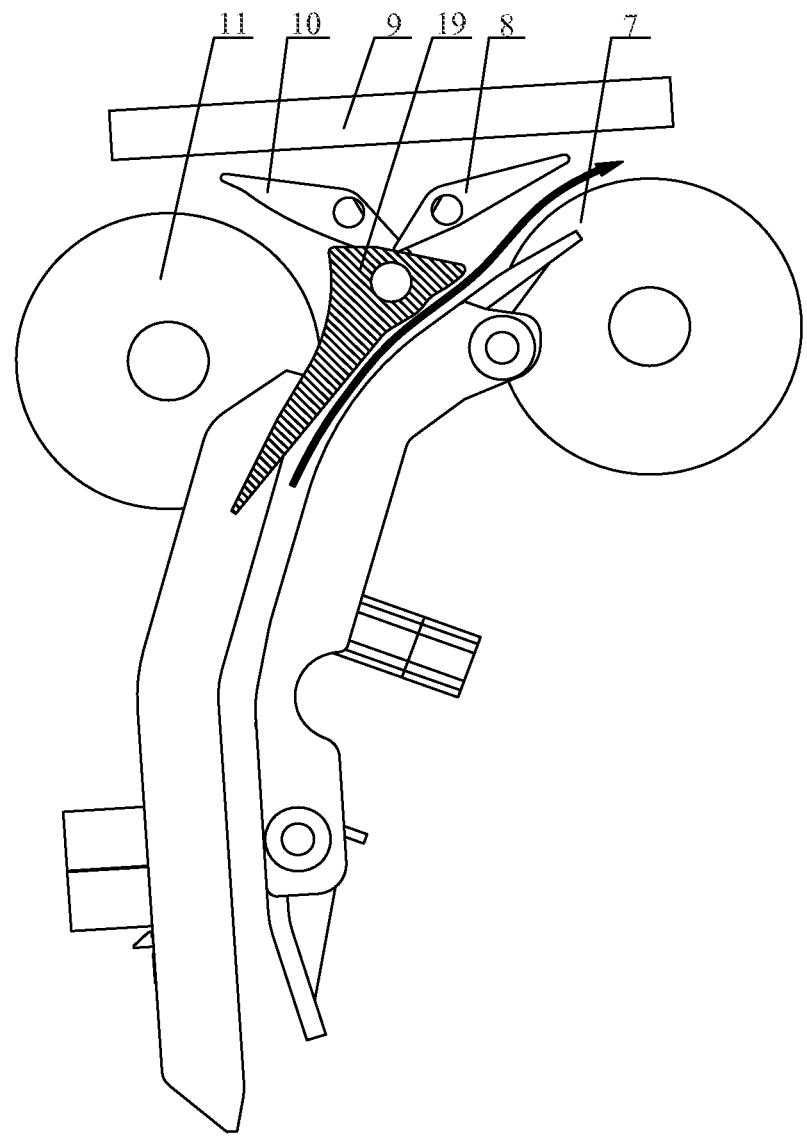
FIG. 5 is an inner structure schematic view of a guider for conveying sheet materials according to an embodiment of the present application, in which the other lateral passage is opened.
Figure 6:
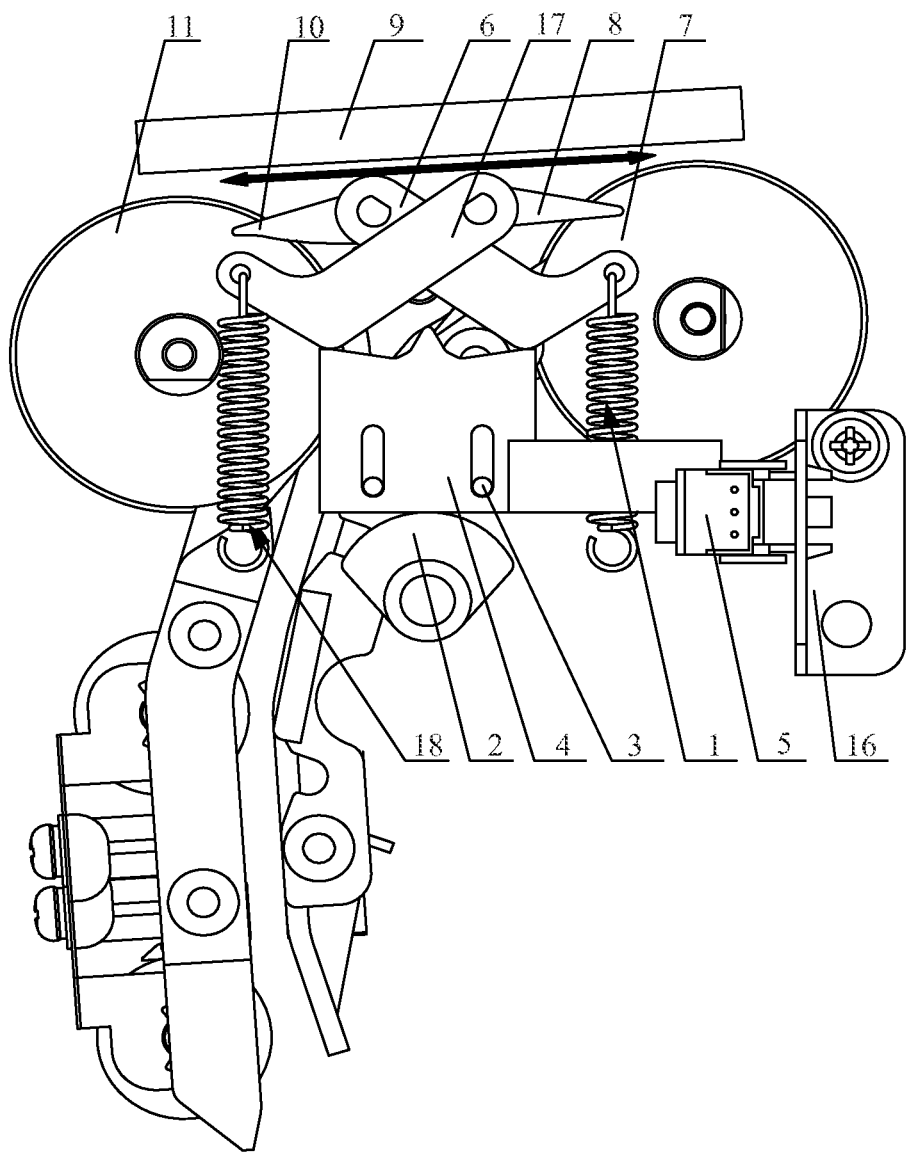
FIG. 6 is a structural schematic view of a guider for conveying sheet materials according to an embodiment of the present application, in which a horizontal passage is opened.
Figure 7:
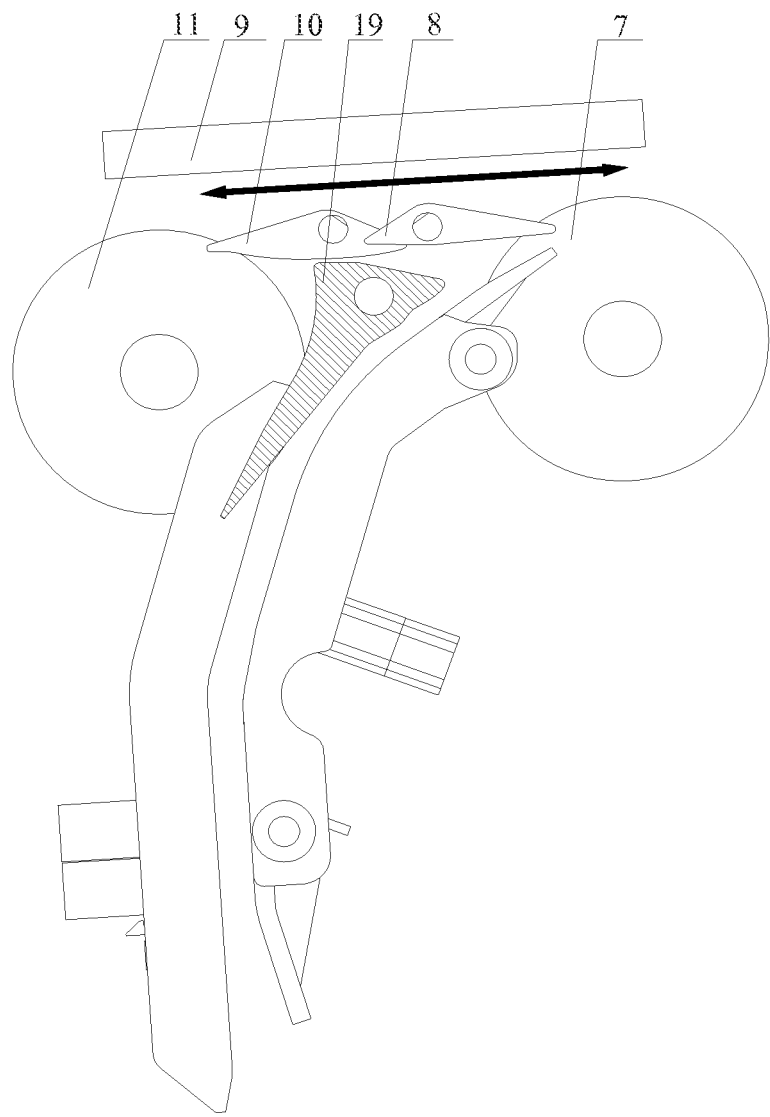
FIG. 7 is an inner structure schematic view of the guider for conveying sheet materials in the state of FIG. 6.

Referring to FIGS. 1 and 2, FIG. 1 is a structural schematic view of a guider for conveying sheet materials according to an embodiment of the present application; and FIG. 2 is a partial structural schematic view of a guider for conveying sheet materials according to an embodiment of the present application.

The guider for conveying sheet materials according to the embodiment of the present application includes two side plates (a side plate 13 and a side plate 14), two wheel assemblies (a wheel assembly 7 and a wheel assembly 11), two lateral passage assemblies (a lateral passage assembly 10 and a lateral passage assembly 8), two swing plates (a swing plate 6 and a swing plate 17), a first driving device, a reversing member 19 and a second driving device.

The wheel assembly 7 and the wheel assembly 11 are disposed in parallel between the side plate 13 and the side plate 14. A top passage plate 9 is provided at the tops of the wheel assembly 7 and the wheel assembly 11, such that a horizontal passage is formed between the top passage plate 9 and the wheel assemblies 7, 11.

The lateral passage assembly 10 and the lateral passage assembly 8 are disposed among the top passage plate 9 and the two wheel assemblies. A lateral passage is formed between the lateral passage assembly 10 and the wheel assembly 11 which are located at the same side, and another lateral passage is formed between the lateral passage assembly 8 and the wheel assembly 7 which are located at the same side. That is, each of the two lateral passages is formed between a lateral passage assembly and the wheel assembly located at the same side. Two ends of each lateral passage assembly are hinged to the two side plates, respectively, such that the lateral passage assemblies can rotate relative to the side plates.

Two swing plates (a swing plate 6 and a swing plate 17) are fixedly connected to the two lateral passage assemblies (the lateral passage assembly 10 and the lateral passage assembly 8), respectively.

The first driving device is configured to drive the two swing plates to swing.

The reversing member 19 is hingedly provided between the two lateral passages and is configured for redirection of the sheet materials between the two lateral passages. The second driving device is provided to drive the reversing member 19 to rotate, thereby achieving the switch between the two lateral passages.

In the guider for conveying sheet materials according to the embodiment of the present application, a horizontal passage is formed between the top passage plate 9 and the two lateral passage assemblies disposed among the two wheel assemblies and the top passage plate 9, and a lateral passages is formed between each lateral passage assembly and the wheel assembly located at the same side. Thus, the horizontal passage and two lateral passages are formed by the above components, thereby achieving the conveying of sheet materials in three directions as the guider in the prior art. In addition, two ends of each of the two lateral passage assemblies are hinged to two side plates, respectively, and two swing plates are disposed on the two lateral passage assemblies, respectively. Since each lateral passage assembly is hinged to the two side plates, the two lateral passage assemblies can rotate relative to each other when the first driving device drives the swing plates to swing. Since the two lateral passage assemblies form the horizontal passage and the lateral passages, the switch between the horizontal passage and the lateral passages can be achieved with the swings of the lateral passage assemblies. Besides, the second driving device drives the reversing member to rotate, thereby achieving the switch between the two lateral passages, which can ensure that sheet materials are conveyed in one of the lateral passages.

Compared with the guider in the prior art, in the guider for conveying sheet materials according to the present application, only the second driving device is needed to rotate the reversing member hinged between the two lateral passages to achieve the switch between the two lateral passages. There is no need to provide transmission components at both ends of the reversing member because of the hinged arrangement of the reversing member. In the present application, the switch between the two lateral passages can be achieved merely by rotating the reversing member through the second driving device. While in the prior art, the step motor, the driving wheel, the driving rod and the pinion and rack transmission mechanisms at both ends of the driving rod are all needed to achieve the switch between the two lateral passages. Compared with the switch between two lateral passages achieved by a series of transmission components in the prior art, the guider for conveying sheet materials according to the present application has a simplified structure.

In addition, in the prior art, two ends of the guider body are arranged on two opposite guide plates, respectively, the two guide plates must move upwardly or downwardly simultaneously to achieve the upward or downward movement of the guider body. Thus, each of the two ends of the guider body must be provided with a pinion and rack transmission for the upward or downward movement of the guider body. However, in the present application, since the reversing member is hinged between the two lateral passages, only the second driving device is needed to drive the reversing member to rotate, there is no need to provide driving mechanisms at both ends of the reversing member. Accordingly, compared with the prior art, the structure of the guider according to the present application is simplified.

Meanwhile, in the guider for conveying sheet materials according to the embodiment of the present application, the reversing member for the switch between the two lateral passages is driven by the second driving device, and the movements of the swing plates are achieved by the first driving device. Thus, at most two power sources are applied in the guider for conveying sheet materials according to the present application. Compared with the guider in the prior art which employs the step motor and two lifting magnets to achieve the switch between the passages, in the present application, the power sources are reduced, and the manufacture cost of the guider is reduced.

According to the present application, the second driving device is provided to rotate the reversing member. Preferably, the second driving device may be a tension means, a hydraulic telescopic mechanism or the like.

In the guider for conveying sheet materials according to the embodiment of the present application, when the first driving device is not in operation, the swing plates may swing to the lowest positions under the gravity thereof. At this time, the lateral passages are closed, but the horizontal passage is opened. In the guider for conveying sheet materials according to the embodiment of the present application, a spring 18 is provided at a swing end of the swing plate 17, with one end of the spring 18 being disposed on a part of the side plate 13 located at the same side as the swing plate 17; and a spring 1 is provided at a swing end of the swing plate 6, with one end of the spring 1 being disposed on a part of the side plate 13 located at the same side as the swing plate 6. With the arrangement of the springs, the swing ends of the swing plates can stably swing downwardly at a rapid speed when the horizontal passage is opened by the swing plates.

In the guider for conveying sheet materials according to an embodiment of the present application, the first driving device includes a motor 12, a cam 2, and a movable plate 4 for driving the two swing plates to swing.

The cam 2 is arranged at an output end of the motor 12, with an edge of the cam being in contact with one end of the movable plate 4. The other end of the movable plate 4 is in contact with the swing ends of the two swing plates.

An operation process of the first driving device is as follows. The cam 2 is rotated under the drive of the motor 12. When the cam 2 is rotated to its highest position, the movable plate 4 is moved to its highest position under the action of the cam 2, thereby pushing the two swing plates upwardly, and the two swing plates in turn drive the two lateral passage assemblies to rotate, such that the horizontal passage is opened, while the lateral passages are closed. When the horizontal passage is desired to be closed, the cam 2 is rotated to its lowest position, and the two lateral passage assemblies swing downwardly, thereby the horizontal passage is closed, while the two lateral passages are opened. Preferably, a V-shaped groove is formed by the two swing plates, and a positioning protrusion cooperated with the V-shaped groove is provided on the movable plate 4, such that the swing plates can swing more stably under the drive of the first driving device. For further optimizing the above technical solution, oblong guiding holes are provided on the movable plate 4, and a guiding shaft 3 is provided in each of the oblong guiding holes. During the movement of the movable plate 4, each guiding hole moves relative to corresponding guiding shaft 3, which improves the stability of the movement of the movable plate 4 and the accuracy of the moving route of the movable plate 4.

Preferably, the motor 12 is fixedly connected to the side plate 13 adjacent to the motor 12 via a motor fixing seat 15.

Of course, the first driving device described above is merely an example for achieving the switch between the horizontal passage and the lateral passages of the guider according to the embodiments of the present application. The first driving device may be substituted by a hydraulic component, a pneumatic component or the like. For example, a hydraulic telescopic cylinder is employed, and the telescopic movement of its telescopic end can achieve the swing of the swing plates, so as to achieve the switch between the horizontal passage and the lateral passages.

In the guider for conveying sheet materials according to the present embodiment, the guider further includes a controller and a sensor 5. The controller is configured to control the motor 12. The sensor 5 is located at a side of a bottom end of the movable plate 4 and is configured to sense the movable plate 4. The controller controls the activation of the motor 12 according to an output signal of the sensor 5. When it is desired to open the horizontal passage, the sensor 5 senses the movable plate 4. If the movable plate 4 is not detected, it shows that the horizontal passage is in an open state. If the movable plate 4 is detected, it shows that the horizontal passage is in a closed state, and then the sensor sends a signal to the controller to control the motor 12 to operate. After the cam 2 pushes the movable plate 4 upwardly, the horizontal passage is opened. At this time, the sensor can not sense the movable plate 4, and then the sensor sends a signal to the controller to stop the motor 12. Similarly, if it is desired to open the lateral passages, the sensor senses the movable plate 4. If the movable plate 4 is detected, it shows that the lateral passages are in the open state; and if the movable plate 1 is not detected, it shows that the lateral passages are not opened. At this moment, the sensor sends a control signal to the controller to activate the motor 12. The motor 12 drives the cam 2 to rotate. After the movable plate 4 falls back, the lateral passages are opened. At this time, the sensor senses the position of the movable plate 4, and then sends a control signal to the controller to stop the motor 12.

The sensor 5 is fixedly connected to the side plate 13 adjacent to the sensor 5 via a sensor fixing seat 16.

Preferably, each of the lateral passage assembly 10 and the lateral passage assembly 8 is provided with a plurality of comb teeth, which facilitate the guiding for the sheet materials. More preferably, the plurality of comb teeth is uniformly distributed on each lateral passage assembly.

The guider for conveying sheet materials according to the embodiments of the present application is applicable to the processing of sheet materials such as banknotes or bills, and may be applied to some apparatus such as a ticket vending machine or an automatic teller machine. Preferably, the guider for conveying sheet materials is used as a guider for conveying banknotes.

The person skilled in the art can implement or apply the present application based on the above description of the embodiments. It is apparent that the person skilled in the art may make many modifications made to these embodiments. The general principle defined herein may be implemented in other embodiments without departing from the spirit or scope of the present application. Thus, the present application will not be limited to the embodiments illustrated herein, but conforms to the broadest scope which is consistent with the principle and novel features disclosed herein.

What is claimed is:

1. A guider for conveying sheet materials, comprising:
two side plates;
two wheel assemblies disposed in parallel between the two side plates, a top passage plate being provided at the tops of the two wheel assemblies;
two lateral passage assemblies provided among the top passage plate and the two wheel assemblies, wherein the two lateral passage assemblies can form a horizontal passage with the top passage plate, and each of the lateral passage assemblies can form a lateral passage with the wheel assembly located at the same side, wherein two ends of each of the lateral passage assemblies are hinged to the two side plates;
the guider further comprises:
two swing plates fixedly connected to the two lateral passage assemblies, respectively;
a first driving device configured to drive the two swing plates to swing;
a reversing member hinged between the two lateral passages and configured for the switch between the two lateral passages; and
a second driving device configured to drive the reversing member to swing,
wherein the first driving device comprises a motor, a cam and a movable plate for driving the two swing plates to swing, wherein:
the cam is provided at an output end of the motor, and an edge of the cam is in contact with one end of the movable plate, the other end of the movable plate is in contact with swing ends of the two swing plates.

2. The guider for conveying sheet materials according to claim 1, wherein a spring is provided at a swing end of each of the two swing plates, and is connected to the side plate located at the same side as the swing plates.

3. The guider for conveying sheet materials according to claim 1, wherein each of the two lateral passage assemblies comprises a rotation shaft and a plurality of comb teeth provided on the rotation shaft.

4. The guider for conveying sheet materials according to claim 3, wherein the plurality of comb teeth is uniformly provided on the rotation shaft.

5. The guider for conveying sheet materials according to claim 1, wherein a V-shaped groove is formed by the two swing plates, and a positioning protrusion cooperated with the V-shaped groove is provided on the movable plate.

6. The guider for conveying sheet materials according to claim 5, wherein oblong guiding holes are provided in the movable plate in a direction of the movement of the movable plate, and a guiding shaft is provided in each of the oblong guiding holes.

7. The guider for conveying sheet materials according to claim 1, further comprising a controller and a sensor, wherein the controller is configured to control the motor to activate or stop, and the sensor is located at a side of a bottom end of the movable plate and is configured to sense the movable plate, and the controller controls the motor to activate or stop according to an output signal of the sensor.

8. The guider for conveying sheet materials according to claim 7, wherein the sensor is fixedly connected to the side plate adjacent to the sensor via a sensor fixing seat.

9. The guider for conveying sheet materials according to claim 1, wherein the guider for conveying sheet materials is a guider for conveying banknotes.

10. The guider for conveying sheet materials according to claim 2, wherein the guider for conveying sheet materials is a guider for conveying banknotes.

11. The guider for conveying sheet materials according to claim 3, wherein the guider for conveying sheet materials is a guider for conveying banknotes.

12. The guider for conveying sheet materials according to claim 4, wherein the guider for conveying sheet materials is a guider for conveying banknotes.

13. The guider for conveying sheet materials according to claim 5, wherein the guider for conveying sheet materials is a guider for conveying banknotes.

14. The guider for conveying sheet materials according to claim 6, wherein the guider for conveying sheet materials is a guider for conveying banknotes.

15. The guider for conveying sheet materials according to claim 7, wherein the guider for conveying sheet materials is a guider for conveying banknotes.

16. The guider for conveying sheet materials according to claim 8, wherein the guider for conveying sheet materials is a guider for conveying banknotes.

\* \* \* \* \*